United States Patent
Noro et al.

(10) Patent No.: US 6,880,744 B2
(45) Date of Patent: Apr. 19, 2005

(54) METHOD OF APPLYING BRAZING MATERIAL

(75) Inventors: Shinya Noro, Nishio (JP); Takashi Hattori, Kariya (JP); Akihisa Iduhara, Nishio (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 10/350,463

(22) Filed: Jan. 24, 2003

(65) Prior Publication Data

US 2003/0141350 A1 Jul. 31, 2003

(30) Foreign Application Priority Data

Jan. 25, 2002 (JP) ........................................ 2002-017154
Apr. 11, 2002 (JP) ........................................ 2002-109280

(51) Int. Cl.$^7$ ............................ B23K 31/02; B21D 53/02
(52) U.S. Cl. .................... 228/182; 228/183; 29/890.03; 29/890.043; 29/890.052
(58) Field of Search ................................ 228/183, 182; 29/890.03, 890.043, 890.052

(56) References Cited

U.S. PATENT DOCUMENTS

| | | | | |
|---|---|---|---|---|
| 4,722,630 A | * | 2/1988 | Fang ............................ | 403/30 |
| 5,360,158 A | * | 11/1994 | Conn et al. ................. | 228/56.3 |
| 6,078,028 A | * | 6/2000 | Cooper et al. .............. | 219/270 |

\* cited by examiner

*Primary Examiner*—Lynne R. Edmondson
(74) *Attorney, Agent, or Firm*—Harness, Dickey & Pierce, PLC

(57) ABSTRACT

In a method of applying a brazing material to braze a joining portion between a first member and a second member, a relationship between an amount of the brazing material and an expanding dimension of the brazing material is determined. Then, a position to apply the brazing material or a necessary amount of the brazing material is decided based on the relationship. After the first member and the second member are joined, the brazing material is applied. The position is defined by a distance from the joining portion. The distance is set smaller than one-half the expanding dimension of the brazing material on an applying surface.

19 Claims, 4 Drawing Sheets

METHOD OF APPLYING BRAZING MATERIAL

CROSS REFERENCE TO RELATED APPLICATION

This application is based on Japanese Patent Applications No. 2002-17154 filed on Jan. 25, 2002 and No. 2002-109280 filed on Apr. 11, 2002, the disclosure of which are incorporated herein by reference.

FIELD OF THE INVENTION

The present invention relates to a method of applying a brazing material for brazing a joining portion between members.

BACKGROUND OF THE INVENTION

As a method of applying a brazing material, it is generally known to apply the brazing material to entirely cover a surface of a member, such as by cladding or thermal spraying. In a case that the brazing condition at the brazed portion between members is inadequate, it is generally coped with an increase in a clad rate or an increase in an amount of coating. As a result, an amount of the brazing material is increased. The brazing material is also applied to unnecessary portions.

In a heat exchanger, for example, if holes for joining tubes are punched on a header tank clad with the brazing material, the brazing material is likely to be broken.

SUMMARY OF THE INVENTION

The present invention is made in view of the above disadvantages, and it is an object of the present invention to provide a method of applying a brazing material to braze a joining portion between members with a necessary amount of a brazing material.

According to a method of applying a brazing material to braze a joining portion between a first member and a second member, a relationship between an amount of the brazing material and an expanding dimension of the brazing material on an applying surface is determined. Based on the relationship, one of a position to apply the brazing material and a necessary amount of the brazing material is decided. After the first member and the second member are joined, the brazing material is applied.

According to the method, the position and necessary amount of the brazing material are easily decided, irrespective of a shape of the joining portion. Since the applying position and necessary amount of the brazing material is controlled based on the relationship, the joining portion is securely brazed with the necessary amount of the brazing material.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

The first embodiment will be described hereinafter with reference to FIGS. 1A to 3. The present invention is employed to braze a joining portion such as between a header tank (first member) 110 and tubes (second members) 120 of a condenser 100 in a refrigerant cycle system.

Figure 1A:
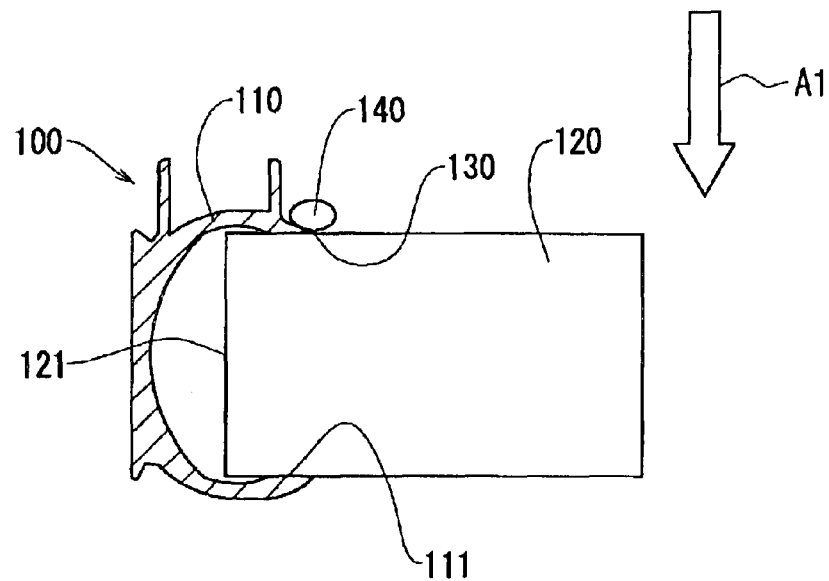
FIG. 1A is a cross-sectional view of a part of a condenser according to the first embodiment of the present invention.
Figure 1B:
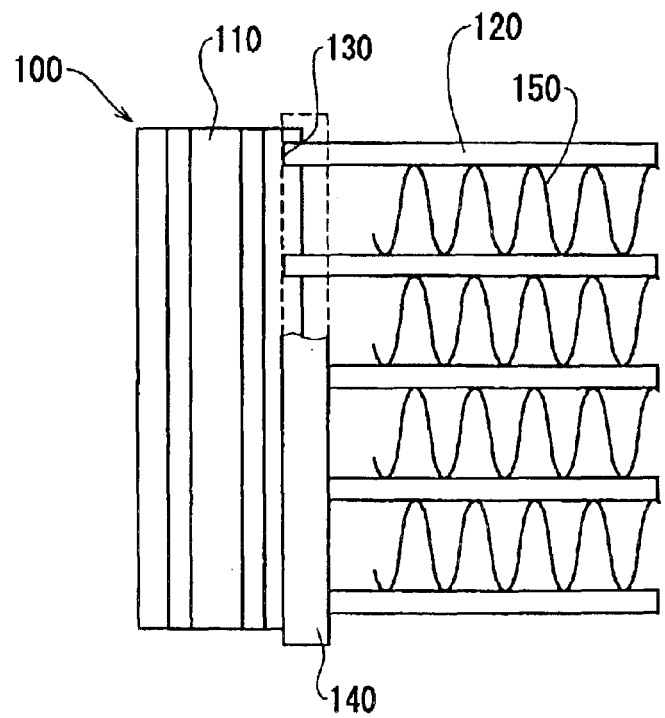
FIG. 1B is a plan view of the part of the condenser according to the first embodiment of the present invention.

As shown in FIGS. 1A and 1B, the condenser 100 is a well-known heat exchanger to condense refrigerant in the refrigerating cycle system. The condenser 100 includes header tank 110 and a stack of tubes 120. The header tank 110 and tubes 120 are made of aluminum or aluminum alloy. The header tank 110 and tubes 120 are formed by extrusion and surfaces thereof are provided with no brazing material. As shown in FIG. 1B, fins 150 are interposed between the tubes 120. The fins 150 are made of aluminum or aluminum alloy and surfaces thereof are clad with a brazing material.

The header tank 110 is formed with a plurality of holes 111. Ends of the tubes 120 are fitted in the holes 111, thereby constructing joining portions 130.

Figure 2:
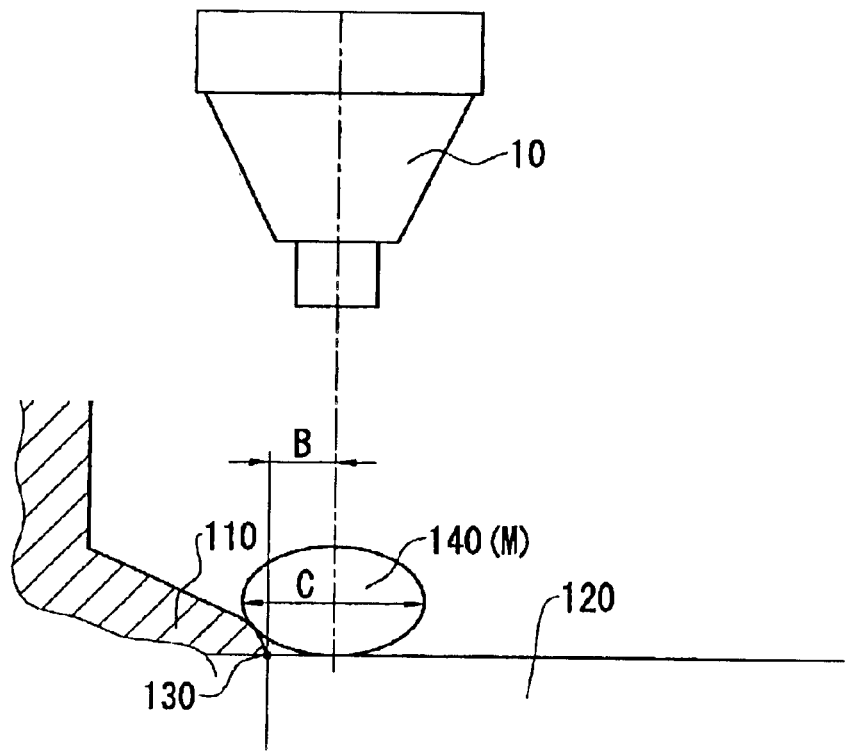
FIG. 2 is a schematic view showing a dimensional relationship between a joining portion and a position where a brazing material is applied, according to the first embodiment of the present invention.

After the header tank 110 and the tubes 120 are assembled as shown in FIGS. 1A and 1B, the brazing material 140 is applied with a brazing material applying device 10 shown in FIG. 2. Then, the assembly is placed in a furnace, so the joining portions 130 are brazed with the applied brazing material 140. The fins 150 are brazed to the tubes 120 with the brazing material previously clad on the surfaces of the fins 150.

The present invention is characterized in a method of applying the brazing material 140 to braze the joining portions 130. The method will be described hereinafter in detail.

Figure 3:
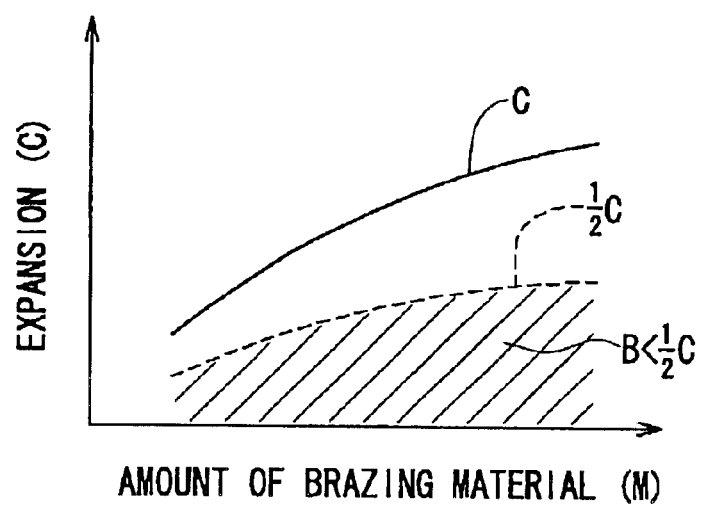
FIG. 3 is a graph showing a relationship between an amount of the brazing material and an expansion of the brazing material, according to the first embodiment of the present invention.

First, a relationship between an amount M of the brazing material 140 and its expanding dimension C of the brazing material on a surface that it is applied is determined, as shown in FIG. 3. In this relationship, it is considered that the applied brazing material 140 is capable of reaching the joining portion 130 and filling around the joining portion 130.

Here, the expanding dimension C of the brazing material 140 is determined by the amount M and viscosity ρ of the brazing material 140. Thus, the dimension C increases in accordance with an increase in the amount M, as shown in FIG. 3. The lower the viscosity ρ is, the more the dimension C increases.

A position to apply the brazing material 140 is decided as follows. As shown in FIG. 2, the position is defined by a distance B from the joining portion 130 on the applying surface. Here, the distance B is smaller than one-half of the expanding dimension C (B<½C) on the applying surface such that the brazing material 140 reaches the joining portion 130. In FIG. 3, the distance B is shown within a diagonally shaded area.

Based on the relationship shown in FIG. 3, a necessary amount of the brazing material 130 is decided and further the applying position is decided. Thus, brazing material applying condition is maintained.

Depending on a shape of the joining portion 130 between the members, the applying position can be decided first such that the brazing material 140 can be stably applied. Then, the necessary amount of the brazing material 130 is decided in accordance with the position. Thus, the brazing material applying condition can be maintained.

After the applying position and the necessary amount are decided, the brazing material 140 is applied. As shown in FIG. 1A, the brazing material 140 is applied to the joining portion 130 from one side of the condenser 100 in an external fluid flow direction (arrow A1), that is, a direction of cooling air flow during a performance of heat exchange. The paste brazing material 140 is applied partially with respect to an entire length of each joining portion 130. Here, the entire length of the joining portion 130 means an entire circumference of the hole 111 to which the tube 120 is fitted. The brazing material 140 is applied continuously in line-form along a stacking direction of the tubes 120, that is, in a longitudinal direction of the header tank 110.

When the brazing material 140 is applied, the condenser 100 is placed such that the air flow direction (A1) is in a vertical direction, that is, the tank 110 is placed horizontally. Since the brazing material 140 is applied from the top, the melted brazing material 140 flows downward by its gravity force and flows into a clearance in the joining portion 130. Therefore, the brazing material 130 fills around the entire circumference between the hole 111 and the tube 120.

As described above, since the relationship between the amount M and the expanding dimension C of the brazing material 140 is previously determined, the applying position and the necessary amount are easily decided based on the relationship, irrespective of the shape of the joining portion 130. The applying position is determined based on the expanding dimension C of the brazing material 140. The relationship between the applying position and the necessary amount is controlled. Therefore, it is possible to securely braze the joining portions 130 with a necessary amount of the brazing material 140.

Further, the brazing material 140 is applied partially with respect to each joining portion 130. That is, the brazing material 140 is applied only to one side of the condenser 100 in the external fluid flow direction A1. Therefore, the brazing material 140 is easily applied.

Figure 4:
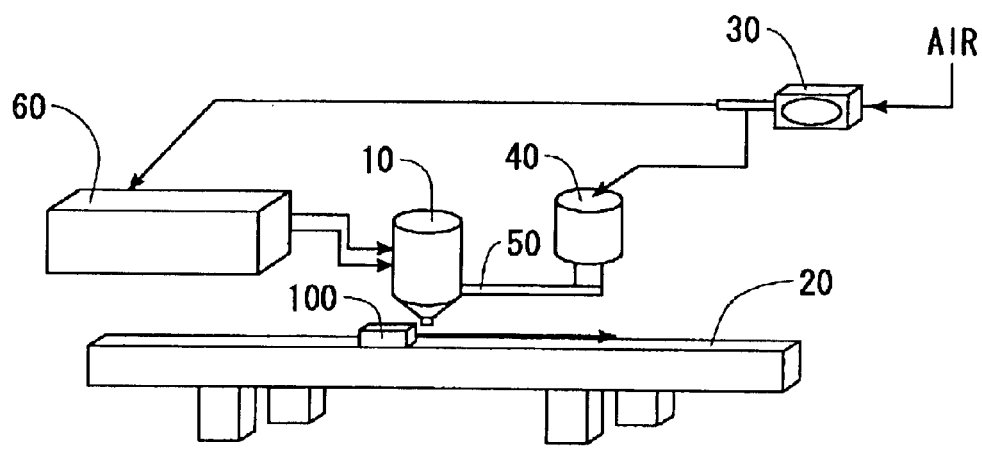
FIG. 4 is a schematic illustration of a brazing material applying apparatus according to the second embodiment of the present invention.

The second embodiment will be described hereinafter with reference to FIGS. 4 and 5. In the second embodiment, the brazing material 140 is applied by using a specific brazing material applying apparatus to shorten time for applying the brazing material 140. As shown in FIG. 4, the brazing material applying apparatus includes a brazing material applying device 10, a conveyer (conveying device) 20, a filter regulator 30, a tank 40, a controller 60 and the like.

The condenser 100 in a state that the header tanks 110, tubes 120 and fins 150 are assembled is placed on the conveyer 120. As shown in FIG. 5, the condenser 100 is placed such that the joining portions 130 are in line along an advancing direction of the conveyer 20.

The brazing material applying device 10 communicates with the tank 40 storing the brazing material 140 through a joint 50. The filter regulator 30 regulates a pressure of air supplied therein and applies a predetermined air pressure to the tank 40 so that the brazing material 140 in the tank 40 is supplied into the brazing material applying device 10.

The controller 60 applies the air pressure from the filter regulator 30 to the brazing material applying device 10. The controller 60 also performs opening and closing an opening, which is formed at the bottom of the brazing material applying device 10, so that the brazing material 140 is applied to the condenser 100 by the brazing material applying device 10.

Figure 5:
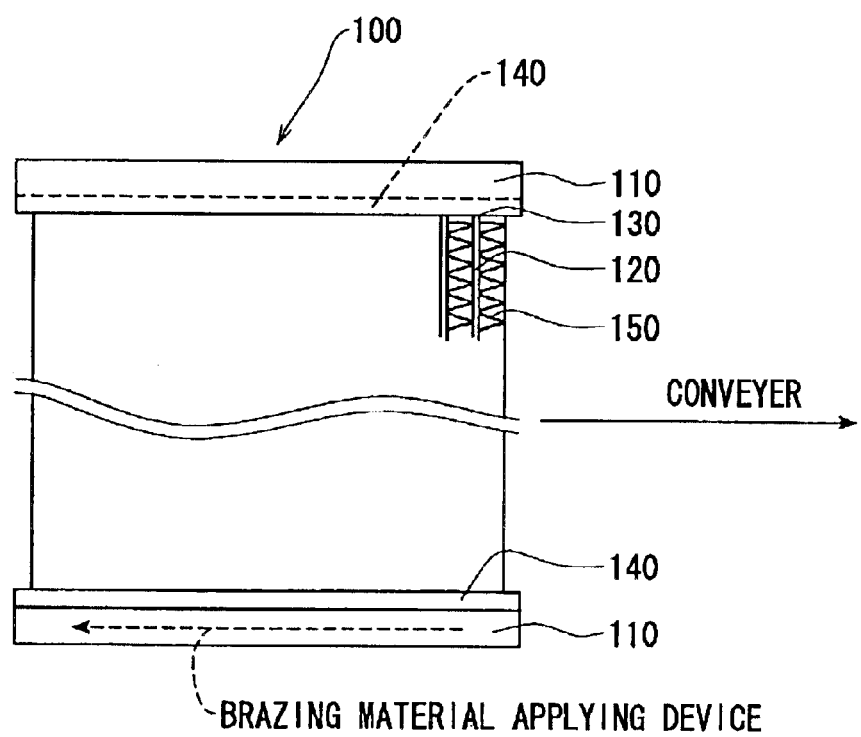
FIG. 5 is a plan view of the condenser showing advancing directions of a conveyer and a brazing material applying device according to the second embodiment of the present invention.

Further, the brazing material applying device 10 is provided to move in a direction opposite to the advancing direction of the conveyer 20 while applying the brazing material 140, as shown by a dotted arrow in FIG. 5.

Accordingly, a moving speed of the brazing material applying device 10 is added to an advancing speed of the conveyer 20 in the opposite direction. Therefore, a time for applying the brazing material 140 is shortened, thereby improving manufacturability.

Two brazing material applying devices 10 can be used, so the brazing material 140 is applied to the joining portions 130 on both ends of the tubes 120 at the same time.

In the first and second embodiment, the present invention is employed to apply the brazing material 140 for brazing the joining portions 130 between the header tank 110 and the tubes 120 of the condenser 100. The present invention can be employed to apply the brazing material to braze joining portions between other members. For example, the present invention is applied to braze between a tank and a connector or between a side plate and a bracket in a heat exchanger.

The brazing material applying position is defined by the distance B from on the joining portion 130 on the applying surface. Alternatively, the position B can be decided based on another position having a clear positional relationship with the joining portion 130.

Figure 6:
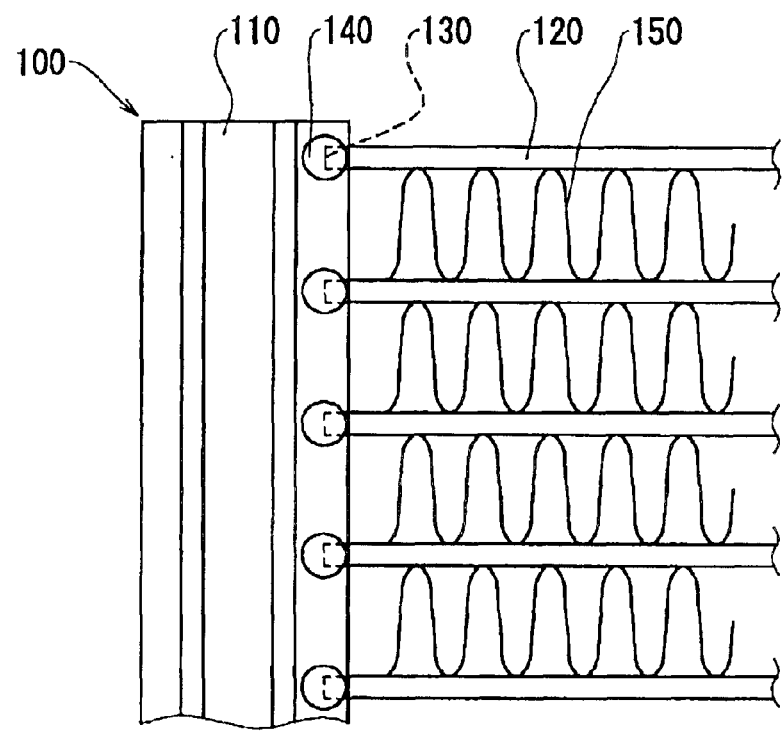
FIG. 6 is a plan view of the part of the condenser for showing an applying position of the brazing material according to another embodiment of the present invention.
Figures 7A, 7B, 7C:
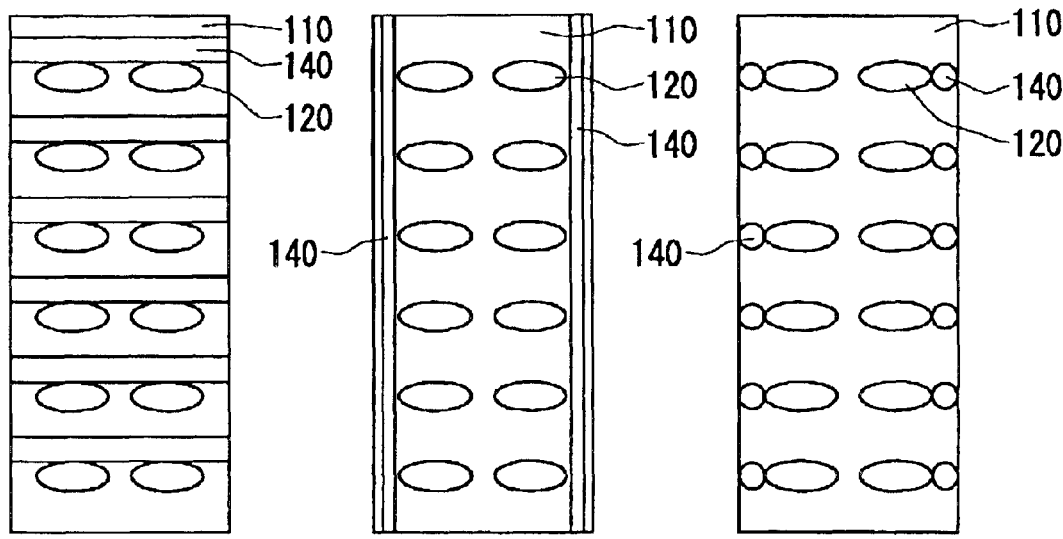
FIGS. 7A to 7C are end views of tubes for showing an applying position of the brazing material according to another embodiment of the present invention.

The brazing material 140 is applied in line-form along the longitudinal direction of the header tank 10. As a modification, the brazing material 140 can be applied at predetermined intervals. For example, it is applied at a pitch corresponding to tubes 120, as shown in FIG. 6. Further, in a case that the tubes 120 are arranged in two rows, the brazing material 140 is applied partially or in lines, as shown in FIGS. 7A to 7C.

The present invention should not be limited to the disclosed embodiments, but may be implemented in other ways without departing from the spirit of the invention.

What is claimed is:

1. A method of applying a brazing material for brazing a joining portion between a first member and a second member, the method comprising:

determining a relationship between an amount of a brazing material and an expanding dimension of the brazing material on an applying surface;

deciding, based on the relationship, one of a necessary amount of the brazing material using a location spaced from the joining portion as an initial application point for the brazing material and a position spaced from the joining portion to initially apply the brazing material using a specified amount of the brazing material; and applying the brazing material after joining the first member and the second member.

2. The method according to claim 1,
wherein the position is defined by a distance from the joining portion,
wherein the distance is shorter than one-half the expanding dimension of the brazing material on the applying surface.

3. The method according to claim 1, wherein the brazing material is applied adjacent a part of the joining portion.

4. The method according to claim 1,
wherein the first member is a header tank and the second member is a plurality of tubes of a heat exchanger,
wherein the brazing material is applied to a side of the heat exchanger in a direction consistent with a direction of an external fluid flow caused during heat-exchange performance.

5. The method according to claim 4,
wherein the header tank is formed with a plurality of holes to which ends of the tubes are joined,
wherein the brazing material is applied at a point with respect to an entire circumference of each joining portion between the header tank and the tube.

6. The method according to claim 5,
wherein the heat exchanger is placed on a conveyer such that the joining portions are arranged in line along an advancing direction of the conveyer,
wherein the brazing material is applied by a brazing material applying device while the heat exchanger is carried by the conveyer.

7. The method according to claim 6, wherein the brazing material is applied in a continuous line-form along a longitudinal direction of the header tank.

8. The method according to claim 6, wherein the brazing material is applied at predetermined intervals in a longitudinal direction of the header tank.

9. The method according to claim 1, wherein the brazing material is applied by a brazing material applying device while the joined members are conveyed by a conveying device in a direction.

10. The method according to claim 9,
wherein the first and second members include a plurality of joining portions,
wherein the joined members are placed on the conveying device such that the joining portions are arranged in line along the direction that the conveying device advances.

11. The method according to claim 9, wherein the brazing material applying device moves in a direction opposite to the direction that the conveying device advances.

12. A method of applying a brazing material for brazing a joining portion between a first member and a second member, the method comprising:
determining a relationship between an amount of a brazing material and an expanding dimension of the brazing material on an applying surface;
deciding one of a necessary amount of the brazing material and a position to apply the brazing material based on the relationship; and
applying the brazing material after joining the first member and the second member, wherein;
the first member is a header tank and the second member is a plurality of tubes of a heat exchanger, and
the brazing material is applied to a side of the heat exchanger in a direction consistent with a direction of an external fluid flow caused during heat-exchange performance.

13. The method according to claim 12,
wherein the header tank is formed with a plurality of holes to which ends of the tubes are joined,
wherein the brazing material is applied at a point with respect to an entire circumference of each joining portion between the header tank and the tube.

14. The method according to claim 12,
wherein the heat exchanger is placed on a conveyer such that the joining portions are arranged in line along an advancing direction of the conveyer,
wherein the brazing material is applied by a brazing material applying device while the heat exchanger is carried by the conveyer.

15. The method according to claim 12, wherein the brazing material is applied in a continuous line-form along a longitudinal direction of the header tank.

16. The method according to claim 12, wherein the brazing material is applied at predetermined intervals in a longitudinal direction of the header tank.

17. A method of applying a brazing material for brazing a joining portion between a first member and a second member, the method comprising:
determining a relationship between an amount of a brazing material and an expanding dimension of the brazing material on an applying surface;
deciding one of a necessary amount of the brazing material and a position to apply the brazing material based on the relationship; and
applying the brazing material after joining the first member and the second member, wherein the brazing material is applied by a brazing material applying device while the joined members are conveyed by a conveying device in a direction.

18. The method according to claim 17,
wherein the first and second members include a plurality of joining portions,
wherein the joined members are placed on the conveying device such that the joining portions are arranged in line along the direction that the conveying device advances.

19. The method according to claim 17, wherein the brazing material applying device moves in a direction opposite to the direction that the conveying device advances.

* * * * *